United States Patent Office 3,367,809
Patented Feb. 6, 1968

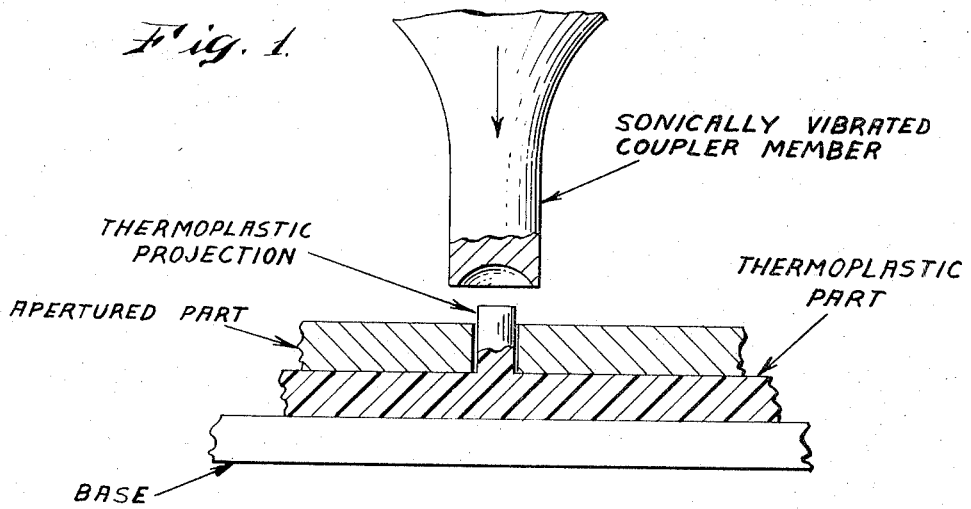
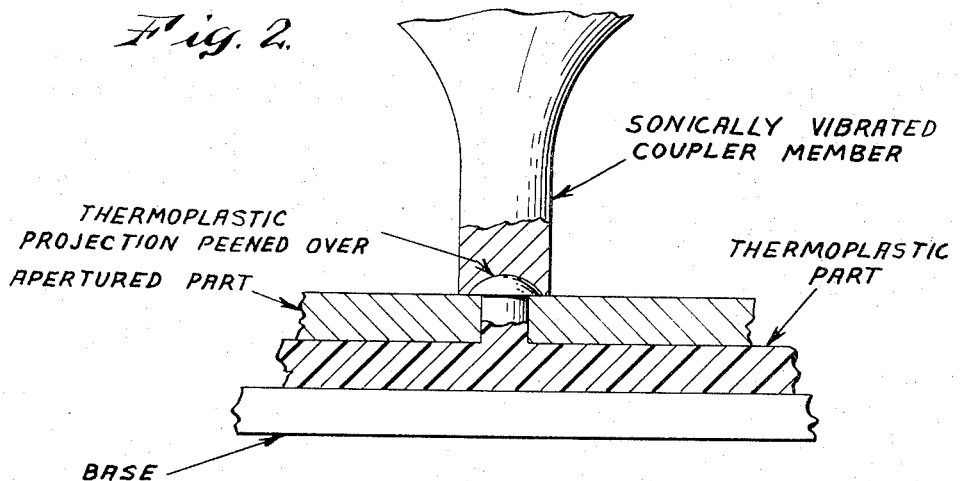

3,367,809
SONICS
Robert S. Soloff, Stamford, Conn., assignor, by mesne assignments, to Branson Instruments, Incorporated, a corporation of Delaware
Filed May 8, 1964, Ser. No. 366,177
9 Claims. (Cl. 156—73)

This application relates to sonics. More particularly, it relates to a sonic method of securing thermoplastic parts to other parts.

It is often desired to secure a part formed of a thermoplastic material to another part which may or may not also be thermoplastic.

Such securement in the past has commonly been done by the use of adhesive. The use of adhesive is inherently messy, however, and the resulting bond is often initially weak or, even if initially satisfactory, becomes brittle and weak with age. If the adhesive escapes the bonding zone, the resulting article may be rendered commercially unacceptable or aesthetically displeasing. Adhesive bonding is slow, because of the long drying time required for the adhesive, and space consuming, because of the large drying areas required. The use of conventional highly volatile and toxic adhesives also creates fire and personal health hazards.

A thermoplastic part may also be secured to another part by providing one or more bosses or studs on the thermoplastic part and a corresponding number of holes in the other part. The bosses are passed through the corresponding holes and the tips of the bosses are thereafter bent or peened over to form a head. The bosses cannot be peened over by impact since they are brittle and readily break off and disintegrate. Accordingly, in the past, a heating iron has been applied to the tips of the bosses to cause the material of the tips to flow and form a head. The joint formed by this method is unsatisfactory, however, since the melted thermoplastic material, upon cooling, contracts to pull away from the adjacent surfaces of the other part, thereby producing a loose joint. Furthermore, it is difficult to control the flow of the melted plastic and the heads therefore vary in shape and strength.

Accordingly, it is an object of the present invention to provide methods of securing thermoplastic parts to other parts which will overcome all of the above noted disadvantages and shortcomings of the prior art methods.

More specifically, it is an object to provide such methods which are quicker than the prior art methods.

A further object is to provide such methods which will give a stronger and more uniform bond than the prior art methods.

A further object is to provide such methods which will result in fewer rejections of the assembled articles.

Yet another object of the invention is to provide thermoplastic bosses, studs and rivets with uniform heads.

A further object of the invention is to provide completely rigid connections between parts by means of thermoplastic bosses, studs and rivets.

A still further object of the invention is to provide decorative heads on thermoplastic bosses, studs and rivets.

Other objects of the invention will in part be obvious and will in part appear hereinafter.

The invention accordingly comprises the several steps and the relation of one or more of such steps with respect to each of the others thereof which will be exemplified in the method hereinafter disclosed, and the scope of the invention will be indicated in the claims.

For a fuller understanding of the nature and objects of the invention, reference should be had to the following detailed description taken in connection with the accompanying drawing in which:

FIGURE 1 is a diagrammatic side elevational view, partially in section, showing the relationship of the various parts and the configuration of the thermoplastic projection prior to being subjected to sonic energy; and FIGURE 2 is a diagrammatic side elevational view, partially in section, showing the deformation of the thermoplastic projection as the result of being subjected to sonic energy whereby to hold the illustrated parts together.

I have discovered that the above-noted difficulties and shortcomings may be overcome by the use of sonic energy to join thermoplastic parts to parts of other materials. More particularly, I have discovered that a part formed of a thermoplastic material may be secured to another part by providing a projection or boss on the thermoplastic part, and, while holding a portion of the other part adjacent the boss on the thermoplastic part, introducing sonic energy into the boss. The sonic energy, when suitably introduced, will change the shape of the boss and thereby secure the parts together.

More specifically, the boss provided on the thermoplastic part should have a height above the base surface of that part greater than the thickness of the portion of the other part which is placed adjacent the boss. The sonic energy is introduced into the boss by placing a coupler member adjacent the tip of the boss and thereafter sonically vibrating the coupler member at a high frequency to beat it downwardly against the tip of the boss. Sonic energy is thus coupled into the boss to heat it and render it flowable so that its tip is peened over by the beating of the coupler member. The portion of the other part held adjacent the boss is thus clamped between the head formed by the peened over tip of the boss and the base surface of the thermoplastic part.

For example, I have employed the method of the invention to secure a disc shaped part formed of nylon material to a ring shaped part formed of metallic material and having a diameter substantially equal to that of the nylon part. The nylon part was provided with a plurality of bosses or projections which extended from the base surface presented by one side of the disc and were spaced uniformly around the circumference of the disc. The metallic part was provided with a corresponding plurality of holes spaced around its circumference. The projections or bosses on the nylon part were of a diameter somewhat less than that of the holes in the metallic part and of a length somewhat greater than the thickness of the metallic part. The bosses on the nylon part were passed through the holes in the metallic part to bring the base surface of the nylon part up against one side of the metallic part and thereby dispose the tips of the bosses beyond the opposite surface of the metallic part as shown in FIGURE 1.

A coupler member was then placed adjacent the tip of one of the bosses and the coupler member thereafter sonically vibrated to beat it against the tip. Sonic energy was thus coupled into the boss to heat it and render it flowable. While thus maintained in a flowable plastic condition, the tip of the boss was readily peened over by the beating of the coupler member to form a head clamping the metallic part between it and the base surface on the nylon part as seen in FIGURE 2. The introduction of high frequency sonic energy into the tip of the boss was also observed to cause radial expansion or swelling of the portion of the boss received within the hole to the diameter of the hole so as to form a tight fit between the boss and the sidewalls of the hole as seen in FIGURE 2. The metallic part was thus firmly clamped against the nylon part by the head of the boss and was prevented from moving laterally relative to the nylon part by virtue of the tight fit of the shank portion of the boss in the hole. This process was then repeated for all of the bosses. The resulting assembly of the nylon and metallic part was extremely rigid and resisted any attempts to separate the parts or to move one part in any direction relative to the other.

In the above example, the coupler member was the concentrating horn of a high powered sonic source. The small area tip of the horn was pressed directly against the tip of the boss so as to positively couple the sonic energy into the boss.

A sonic power source that has been found effective for practicing this invention is disclosed in the copending United States Patent Application of Stanley E. Jacke, et al., entitled "Sonic Disperser," Ser. No. 125,568 filed July 20, 1961. A sonic energy source of the form disclosed in the above-identified application was found to give satisfactory results when operated at a frequency of 20,000 cycles per second and powers of 50 to 60 watts. In the above example, the tip of the horn was flat. This produced a flat head on the boss, so that the peened over boss resembled a flat headed plastic bolt. In another example, a horn tip having a concave surface was employed. In this case, the head formed on the boss was round or dome shaped so that the peened over boss resembled a rivet. Since the tip of the boss flows into a form conforming to that of the horn tip, it is apparent that the bosses may be given any one of several desired final configurations or appearances by selection of a suitably contoured horn tip.

The method of the invention may be carried out at frequencies and power levels different from those cited above and other sonic power sources may be used. For example, although the invention method had been described throughout with reference to a high intensity power source having a concentrating horn, any sonic source capable of coupling the requisite amount of sonic power into the parts may be employed.

It should be understood that the term "thermoplastic" as used herein and in the claims is meant to include any material which is solid or semi-solid at normal temperature and can melt or become plastic upon the application of heat.

The method is particularly applicable to parts formed of organic polymeric material.

It should further be understood that the term "plastics" as used herein and in the claims is meant to include all plastic substances; the word "plastics" is employed in specific distinction to "plastic," the latter as herein employed being understood to mean any substance capable of being molded.

It will thus be seen that the objects set forth above, among those made apparent in the preceding description, are efficiently attained. Thus, for example, since the method of the invention may be carried out substantially instantaneously, it is quicker than the prior art method wherein time was required for adhesive to dry and set or for heat to be conducted through the bosses by the heating iron to melt the tip. Also, the joint formed by the method of the invention, by virtue of the combined action of the peening over of the tip of the boss and the radial expansion of the shank of the boss, positively prevents relative movement of the parts in any direction. In the prior art wherein the tips of the bosses were melted by a heating iron, the joint resulting following the cooling and contraction of the melted thermoplastic material was loose, allowing relative movement of the part in at least one, if not several, directions. Also, the method of the invention produces less rejects than the prior art method since there is no adhesive to overrun the bonding zone and ruin the appearance of the article.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Having described my invention, what I claim as new and desire to secure by Letters Patent is:

1. A method of securing a thermoplastic part having a projection upstanding from a base surface thereof to another part having a portion of a thickness less than the height of said projection comprising, in combination, the steps of:
    (A) placing said part portion on said base surface adjacent said projection;
    (B) placing a coupler member in contact with the tip of said projection; and,
    (C) ultrasonically vibrating said coupler member to beat it downwardly against said tip, whereby ultrasonic energy is coupled into said projection to heat it and render it flowable and its tip is peened over by the beating of the coupler member to clamp said part portion between said tip and said base surface.

2. The method of claim 1 wherein said thermoplastic part is formed of a plastics material.

3. A method of securing a part having an opening to a thermoplastic part having a portion of dimensions to fit loosely in said opening comprising, in combination, the steps of:
    (A) placing said part portion in said opening;
    (B) placing a coupler member in contact with a free end of said portion; and,
    (C) ultrasonically vibrating said coupler member to beat it against said free end, whereby ultrasonic energy is coupled into said part portion to heat it and render it flowable and it is swelled by the beating of the coupler member to form a tight fit at said opening.

4. A method of securing a first part having a hole extending therethrough to a part formed of a thermoplastic plastics material and having a projection upstanding from a base surface thereof and of a diameter less than that of said hole and a length greater than the thickness of said first part at said hole comprising, in combination, the steps of:
    (A) passing said projection through said hole to bring said base surface up against one surface of said first part and thereby dispose the tip of said projection beyond the opposite surface of said first part;
    (B) placing a coupler member adjacent said tip; and,
    (C) ultrasonically vibrating said coupler member to beat it against said tip, whereby ultrasonic energy is coupled into said projection to render it flowable so that the beating of said coupler member
        (a) peens over said tip to claim said first part between said tip and said base surface and
        (b) swells the portion of said projection within said hole to form a tight fit thereat.

5. A method of securing a part formed of a thermoplastic plastics material to another part, comprising, in combination, the steps of:
    (A) providing a hole extending through said other part;
    (B) providing a projection on said thermoplastic part upstanding from a base surface thereof and of a diameter less than that of said hole and a length greater than the thickness of said first part at said hole;
    (C) passing said projection through said hole to bring said base surface up against one surface of said other part and thereby dispose the tip of said projection beyond the opposite surface of said other part;
    (D) placing the coupler member adjacent said tip; and,
    (E) ultrasonically vibrating said coupler member to beat it against said tip, whereby ultrasonic energy is coupled into said projection to render it flowable so that the beating of said coupler member
- (a) peens over said tip to clamp said first part between said tip and said base surface and
- (b) swells the portion of said projection within said hole to form a tight fit thereat.

6. The method of claim 5 wherein said coupler member is the concentrating horn of an ultrasonic power source.

7. The method of claim 5 wherein said plastics material is an organic polymer.

8. A method of securing together a plurality of parts wherein one of the said parts is formed of a thermoplastic material having a projection upstanding from a base surface and the remainder of said parts having an opening therein, the height of said projecting being greater than the thickness of said remainder of said parts, said method comprising the steps of:
- (A) passing said projection through said opening;
- (B) placing a coupler member in contact with the free end of said projection; and
- (C) ultrasonically vibrating said coupler member to beat it against said free end, whereby ultrasonic energy is coupled into said projection to heat it and render it flowable so as to
  - (a) peen over said free end of said projection to clamp said remainder of said parts between said peened over free end and said base surface, and
  - (b) swell the portion of said projection within said opening to form a tight fit thereat.

9. A method of securing a thermoplastic part having a projection to another part having an opening therein, said method comprising the steps of:
- (A) placing said parts in juxtaposition with said projection disposed in said opening;
- (B) bringing a coupler member into contact with said projection; and
- (C) ultrasonically vibrating said coupler member to introduce ultrasonic energy into said projection to vary its dimensions such that it engages said other part adjacent said opening to secure said parts together.

References Cited
UNITED STATES PATENTS

| | | | |
|---|---|---|---|
| 2,458,152 | 1/1949 | Eakins | 156—91 |
| 2,510,693 | 6/1950 | Green | 156—91 |
| 2,633,894 | 4/1953 | Carwile | 156—73 |
| 2,366,274 | 1/1945 | Luth et al. | 156—293 |
| 3,047,942 | 8/1962 | Schneider | 156—73 |
| 3,184,353 | 5/1965 | Balamuth et al. | 156—303.1 |

OTHER REFERENCES

American Machinist, vol. 105, No. 24, Nov. 27, 1961, pp. 83–85, copy in 72-Vibration Digest.

DOUGLAS J. DRUMMOND, *Primary Examiner.*

UNITED STATES PATENT OFFICE
CERTIFICATE OF CORRECTION

Patent No. 3,367,809                  February 6, 1968

Robert S. Soloff

It is certified that error appears in the above identified patent and that said Letters Patent are hereby corrected as shown below:

Column 4, line 54, "claim" should read -- clamp --.

Signed and sealed this 21st day of October 1969.

(SEAL)
Attest:

Edward M. Fletcher, Jr.            WILLIAM E. SCHUYLER, JR.
Attesting Officer                  Commissioner of Patents